US006985653B2

(12) United States Patent
Lin et al.

(10) Patent No.: US 6,985,653 B2
(45) Date of Patent: *Jan. 10, 2006

(54) STRICTLY NON-BLOCKING SWITCH CORE HAVING OPTIMIZED SWITCHING ARCHITECTURE BASED ON RECIPROCITY CONDITIONS

(75) Inventors: Philip J. Lin, Newton, MA (US); Paul E. Green, Jr., Mount Kisco, NY (US); Ornan A. Gerstel, Cupertino, CA (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/897,642

(22) Filed: Jul. 23, 2004

(65) Prior Publication Data

US 2005/0002601 A1 Jan. 6, 2005

Related U.S. Application Data (63) Continuation of application No. 10/353,425, filed on Jan. 29, 2003, now Pat. No. 6,785,438, which is a continuation of application No. 10/003,127, filed on Nov. 2, 2001, now Pat. No. 6,591,028, which is a continuation of application No. 09/143,335, filed on Sep. 4, 1998, now Pat. No. 6,366,713.

(51) Int. Cl.
 *G02B 6/35* (2006.01)
(52) U.S. Cl. .......................................... 385/17; 385/16
(58) Field of Classification Search ............ 385/15–19, 385/24, 27; 398/41–43, 45–50, 79, 82
 See application file for complete search history.

(56) References Cited

U.S. PATENT DOCUMENTS

| | | | | | |
|---|---|---|---|---|---|
| 3,823,401 A | * | 7/1974 | Berg et al. | .................. | 370/280 |
| 4,038,497 A | * | 7/1977 | Collins et al. | ............... | 370/361 |
| 4,239,329 A | * | 12/1980 | Matsumoto | .................. | 385/11 |
| 4,289,373 A | * | 9/1981 | Sugimoto et al. | ............. | 398/42 |
| 4,493,113 A | * | 1/1985 | Forrest et al. | .............. | 398/139 |
| 4,684,796 A | * | 8/1987 | Johnson | .................... | 250/201.4 |
| 4,787,692 A | * | 11/1988 | Spanke | ........................ | 385/17 |
| 4,846,542 A | * | 7/1989 | Okayama et al. | ............. | 385/17 |
| 4,889,404 A | * | 12/1989 | Bhagavatula et al. | ......... | 398/79 |
| 4,932,735 A | * | 6/1990 | Koai | ........................... | 385/17 |

(Continued)

FOREIGN PATENT DOCUMENTS

DE 3335128 A1 * 11/1985

(Continued)

*Primary Examiner*—John D. Lee
(74) *Attorney, Agent, or Firm*—Cheryl M. Fernandez (57) ABSTRACT

A switch core is set forth that comprises a plurality of duplex switches that are interconnected with a interconnection fabric to implement, for example, strictly non-blocking operation of the switch core for reciprocal traffic. In one embodiment, an N-way reciprocal switch is implemented. The N-way reciprocal switch comprises a plurality of duplex switches numbering N of at least a 1×(N−1) switch type (e.g., the duplex switches have at least N−1 ports available for connection to implement the interconnection fabric). The interconnection fabric interconnects the plurality of duplex switches so that each duplex switch is connected to every other duplex switch used in the interconnection fabric by a single connection. A similar architecture using switches numbering N of at least a 1×N switch type are also set forth. Still further, a plurality of duplex switches are used to implement an (n,m)-way switch that, in turn can be used to construct a recursive LM-way switch core and/or recursively expand an existing Clos switch core.

26 Claims, 5 Drawing Sheets

U.S. PATENT DOCUMENTS

| | | | | |
|---|---|---|---|---|
| 5,009,477 A | * | 4/1991 | Alferness et al. | 385/17 |
| 5,048,910 A | * | 9/1991 | Caron | 385/17 |
| 5,077,483 A | * | 12/1991 | Cloonan et al. | 398/45 |
| 5,146,358 A | * | 9/1992 | Brooks | 398/76 |
| 5,255,332 A | * | 10/1993 | Welch et al. | 385/17 |
| 5,272,555 A | * | 12/1993 | Suzuki | 398/41 |
| 5,274,487 A | * | 12/1993 | Fujimoto et al. | 398/50 |
| 5,325,089 A | * | 6/1994 | Goeldner | 340/2.25 |
| 5,343,314 A | * | 8/1994 | Nakamura et al. | 398/51 |
| 5,359,683 A | * | 10/1994 | Pan | 385/22 |
| 5,408,350 A | * | 4/1995 | Perrier et al. | 398/168 |
| 5,416,662 A | * | 5/1995 | Kurasawa et al. | 361/118 |
| 5,469,277 A | * | 11/1995 | Kavehrad et al. | 359/15 |
| 5,471,340 A | * | 11/1995 | Cheng et al. | 359/281 |
| 5,552,918 A | * | 9/1996 | Krug et al. | 398/139 |
| 5,588,078 A | * | 12/1996 | Cheng et al. | 385/33 |
| 5,608,565 A | * | 3/1997 | Suzuki et al. | 359/237 |
| 5,623,562 A | * | 4/1997 | Anderson et al. | 385/16 |
| 5,648,963 A | * | 7/1997 | Miyake et al. | 370/218 |
| 5,652,813 A | * | 7/1997 | Wilson | 385/24 |
| 5,663,818 A | * | 9/1997 | Yamamoto et al. | 398/58 |
| 5,680,234 A | * | 10/1997 | Darcie et al. | 398/9 |
| 5,712,932 A | * | 1/1998 | Alexander et al. | 385/24 |
| 5,724,165 A | * | 3/1998 | Wu | 398/55 |
| 5,729,642 A | * | 3/1998 | Thaniyavarn | 385/17 |
| 5,734,763 A | * | 3/1998 | Chang | 385/11 |
| 5,739,933 A | * | 4/1998 | Dembeck et al. | 398/45 |
| 5,742,717 A | * | 4/1998 | Saitoh | 385/46 |
| 6,366,713 B1 | * | 4/2002 | Lin et al. | 385/16 |
| 6,591,028 B2 | * | 7/2003 | Lin et al. | 385/16 |
| 6,785,438 B2 | * | 8/2004 | Lin et al. | 385/16 |

FOREIGN PATENT DOCUMENTS

| | | |
|---|---|---|
| EP | 0315351 A3 * | 10/1989 |
| GB | 2172174 A * | 9/1986 |

* cited by examiner

STRICTLY NON-BLOCKING SWITCH CORE HAVING OPTIMIZED SWITCHING ARCHITECTURE BASED ON RECIPROCITY CONDITIONS

CROSS-REFERENCE TO RELATED APPLICATIONS

The present application is a continuation of non-provisional patent application, application Ser. No. 10/353,425, filed on Jan. 29, 2003, now U.S. Pat. No. 6,785,438, which is a continuation of non-provisional patent application, application Ser. No. 10/003,127, filed on Nov. 2, 2001, now U.S. Pat. No. 6,591,028, which is a continuation of non-provisional patent application, application Ser. No. 09/143,335, filed on Sep. 4, 1998, now U.S. Pat. No. 6,366,713.

STATEMENT REGARDING FEDERALLY SPONSORED RESEARCH OR DEVELOPMENT

Not Applicable.

BACKGROUND OF THE INVENTION

Optical switches and switching architectures are used in optical networks for a variety of applications. One application of optical switches is in provisioning of light paths. In this application, the switches are used to form optical cross-connect architectures, which can be readily reconfigured to support new light paths. In this application, the switches are replacements for manual fiber patch panels. As such, switches with millisecond switching times are acceptable. The challenge with respect to such applications is to realize large switch sizes.

At the heart of the optical switch is the switch core. In terms of switching function, switch cores may be characterized as either blocking or non-blocking architectures. A switch core architecture is said to be non-blocking if any unused input port can be connected to any unused output port. Thus a non-blocking switch core is capable of realizing every interconnection pattern between the inputs and the outputs. If some interconnection patterns cannot be realized, the switch is said to be blocking.

Figure 1:
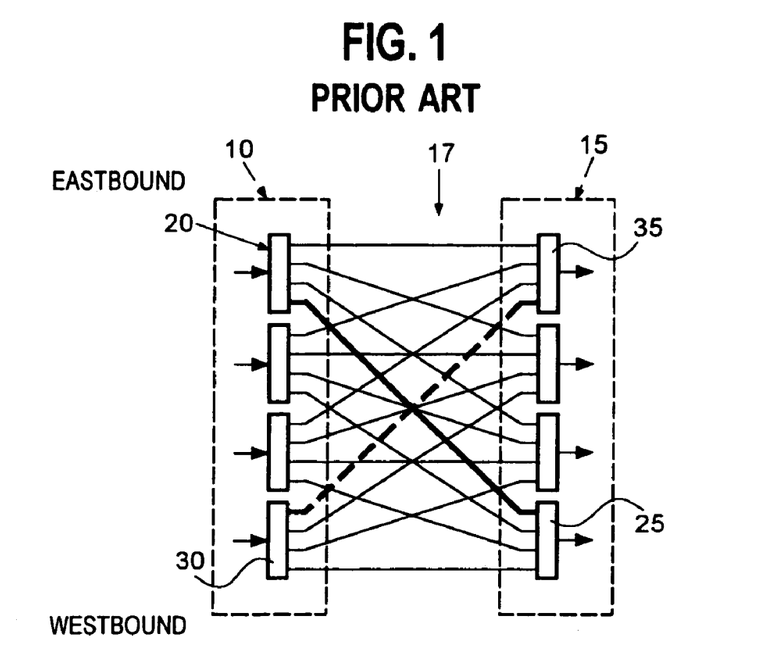
FIG. 1 is a schematic block diagram of a Spanke switch.

A popular architecture for building large non-integrated switch cores is the Spanke architecture illustrated in FIG. 1. In accordance with the Spanke architecture, an N×N switch is made by combining N switches of the 1×N switch type along with N switches of the N×1 switch type, as illustrated. The Spanke architecture results in a strictly non-blocking switch core architecture that requires 2N switches. The switch illustrated in FIG. 1 is a 4×4 switch core.

The increasing popularity of optical networks has resulted in the need for larger optical switch cores, thereby increasing the number of input and output channels (N). Since, in accordance with the formula above, the total number of switches used as well as the size of each switch in the Spanke switch core architecture increases substantially as the number of input and output channels increases, the cost of providing a large switch is significant and, in some instances, prohibitive.

The present inventors have recognized the reciprocal nature of the connections in a typical optical switch core employed in a conventional optical network. These reciprocity conditions have been used by the present inventors to provide a strictly non-blocking optical switch core architecture that significantly reduces the number of switches that are required to construct the switch core.

BRIEF SUMMARY OF THE INVENTION

A switch core is set forth that comprises a plurality of duplex switches that are interconnected with an interconnection fabric to implement, for example, strictly non-blocking operation of the switch core for reciprocal traffic. In one embodiment, an N-way reciprocal switch is implemented. The N-way reciprocal switch comprises a plurality of duplex switches numbering N of at least a 1×(N−1) switch type (e.g., the duplex switches have at least N−1 ports available for connection to implement the interconnection fabric). The interconnection fabric interconnects the plurality of duplex switches so that each duplex switch is connected to every other duplex switch used in the interconnection fabric by a single connection. Such an architecture may also be used to implement a switch that is not strictly non-blocking.

In a second embodiment, an LM multi-stage reciprocal switch core having recursive properties and corresponding (n,m)-way switches are set forth. The LM multi-stage reciprocal switch core is comprised of a plurality of M-way reciprocal switches numbering at least 2L−1. Each of the plurality of M-way reciprocal switches is implemented as an N-way reciprocal switch described above, where N=M. A plurality of (L,2L−1)-way reciprocal switches numbering M are also used. The multi-stage LM reciprocal switch is itself an LM-way reciprocal switch that can be used to recursively build larger switches. For example, the LM reciprocal core switch can be used to implement a larger $L_1M_1$ multi-stage switch in which $M_1$=LM.

Alternatively, or in addition, the M-way switches used to build the LM switch core can also be multi-stage in nature and built from smaller recursive components; i.e., from (j,2j−1)-way switches and (M/j)-way switches.

DETAILED DESCRIPTION OF THE INVENTION

In the Spanke switch architecture illustrated in FIG. 1 for an N×N switch, there are two columns of switches: a left input column of 1×N types switches, shown generally at 10, and a right output column of N×1 type switches, shown generally at 15. The column of switches 10 function as input ports that accept external traffic and direct that traffic through the interconnection fabric, shown generally at 17, while the column of switches 15 function as output ports that provide the switched traffic to an external device.

FIG. 1 also illustrates the case where reciprocity exists for a path connecting the "eastbound" signal at input port 20 to the output port at 25. In accordance with this reciprocity condition, the corresponding "westbound" signal at input port 30 is connected to the output port 35. In a more general sense, reciprocity exists if input port A connects its traffic to output port B whenever input port B connects its traffic to output port A.

The present inventors have recognized that, under such reciprocal path conditions, the port position used by an input switch in the left input column 10 to direct the traffic through the interconnection fabric directly corresponds to the interconnection fabric port position of the corresponding output switch of the right output column 15 (e.g., fabric port 4 of input switch 20 is provided to the output switch 25 which is in the fourth position of the right output column 15, while fabric port 1 of input switch 30 is provided to output switch 35 which is in the first position of the right output column 15).

The reciprocity condition has several interesting consequences. In the switch core of FIG. 1, switch 20 and switch 35 are doing the same thing: they are both set on fabric port position 4. The present inventors have recognized that this means that the switches 20 and 35 can be implemented as the same physical switch with separate beams of light passing in opposite directions through common lenses or mirrors disposed inside the switch. As such, depending on the specific construction of the individual switches, the same actuators, mirrors, lenses, etc., that constitute the lef-to-right connection through input switch 20 can be duplicated to carry a right-to-left connection by employing a second set of optics in which the second set of optics constitutes the output switch 35. In some cases, a second set of optics is not needed. In such instances, the same set of optics can carry two parallel beams going in opposite directions. In effect, the input and output switches are collapsed into a single 1×N duplex switch having two beams of light carrying traffic in opposite directions. For one direction, such a duplex switch is acting like an input 1×N switch, and for the other direction as an output N×1 switch.

Figure 2:
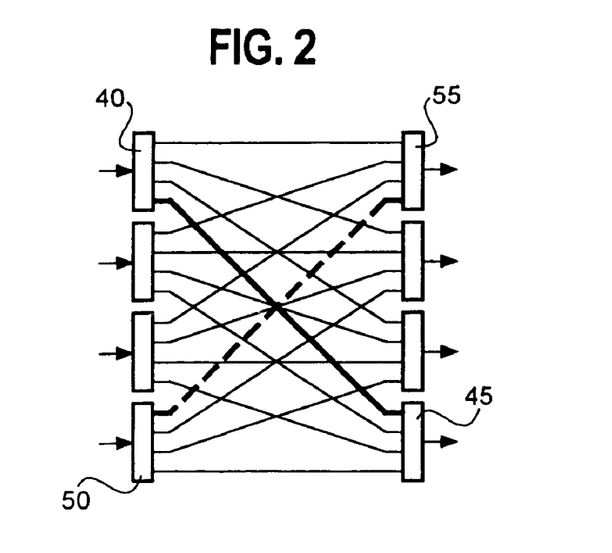
FIG. 2 is a schematic block diagram of a non-square rectangular Spanke switch core.

A square N×N switch architecture is not the only type of architecture in which reciprocity may exist and used to an advantage. FIG. 2 illustrates a non-square rectangular Spanke switch core in which not all inputs are connected to all outputs. Unused paths are indicated by dashed lines. Such a switch, however, can still take advantage of the savings associated with reciprocity. In a reciprocal connection condition, input switch 40, as above, is sending the "eastbound" traffic through the fabric 17 from the fabric port at position 4 to the fabric port at position 1 of the output switch 45 in the fourth position. Likewise, input switch 50 sends the corresponding "westbound" traffic through the fabric 17 from the fabric port at position 1 to the fabric port at position 4 to the output switch 55 in the first position. Once again, such reciprocity means that each input switch can be combined with the corresponding output switch by means of double light paths through common lenses or mirrors. The principal difference between the switch core of FIG. 1 and the switch core of FIG. 2 is that certain paths in the core of FIG. 2 are not utilized as indicated by the thin dashed lines.

Since much of the cost of most switches typically centers on the actuation mechanism and mirror or lens employed in the switch, using a switch that is collapsed so that these components are common to both light paths can approach a 2-to-1 savings, provided that the paths are reciprocal. It has been found, that the typical networks, such as SONET rarely, if ever, violate this reciprocal condition.

Application of the foregoing principles to design large optical switch cores results in a number of different switch core architectures that are optimized when compared to their traditionally designed switch core counterparts. The optimized switch core architectures are comprised of one or more stages of duplex switch modules, such as the single module shown at 60 of FIG. 3. Each duplex switch module 60 is comprised of individual 1×k duplex switches, such as at 65 of FIGS. 3A and 4, where k may vary from switch to switch within the module 60. As noted above, a 1×k duplex switch generally functions as a traditional 1×k switch, but allows signal traffic to flow in both directions of the switch thereby allowing the switch to function as both an input and output switch sharing common optical components for the input and output paths.

Figure 3A:
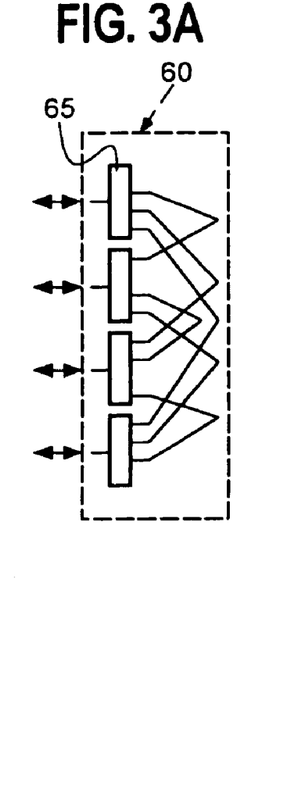
FIGS. 3A and 3B are schematic block diagram of N-way reciprocal switches constructed in accordance with the present invention.

One embodiment of a switch core architecture that uses the foregoing principles to reduce the complexity of the switching architecture is illustrated in FIG. 3A. As illustrated, the optical switch core includes a single N-way duplex module 60 comprised of N switches 65 of the 1×(N−1) duplex switch type (i.e., k=N−1). Such a switch core 60 allows duplex connections between any pair of free ports regardless of existing connections and, as such, is similar to the N×N strictly non-blocking Spanke switch architecture of FIG. 1. However, switch core 60 is only strictly non-blocking for reciprocal traffic.

In the embodiment shown in FIG. 3A, module 60 is a 4-way reciprocal switch core and, as such, uses 4 duplex switches of the 1×3 switch type. The 1×3 duplex switches are interconnected to form the fabric of the 4-way reciprocal switch core in the manner forth in Table 1.

TABLE 1

| Switch Position | Fabric Port | Internal Port Connection |
| --- | --- | --- |
| 1 | 1 | Fabric Port 1 Of Switch at Switch Position 2 |
| 1 | 2 | Fabric Port 1 Of Switch at Switch Position 3 |
| 1 | 3 | Fabric Port 1 Of Switch at Switch Position 4 |
| 2 | 1 | Fabric Port 1 Of Switch at Switch Position 1 |
| 2 | 2 | Fabric Port 2 Of Switch at Switch Position 3 |
| 2 | 3 | Fabric Port 2 Of Switch at Switch Position 4 |
| 3 | 1 | Fabric Port 2 Of Switch at Switch Position 1 |
| 3 | 2 | Fabric Port 2 Of Switch at Switch Position 2 |
| 3 | 3 | Fabric Port 3 Of Switch at Switch Position 4 |
| 4 | 1 | Fabric Port 3 Of Switch at Switch Position 1 |
| 4 | 2 | Fabric Port 3 Of Switch at Switch Position 2 |
| 4 | 3 | Fabric Port 3 Of Switch at Switch Position 3 |

In accordance with the foregoing interconnections of the duplex switches of the 1×(N−1) switch type, each switch is connected to every other switch by a single fabric interconnection. Many other permutations are possible for interconnecting the switches. The principal criterion is to connect each switch to every other switch.

Figure 3B:
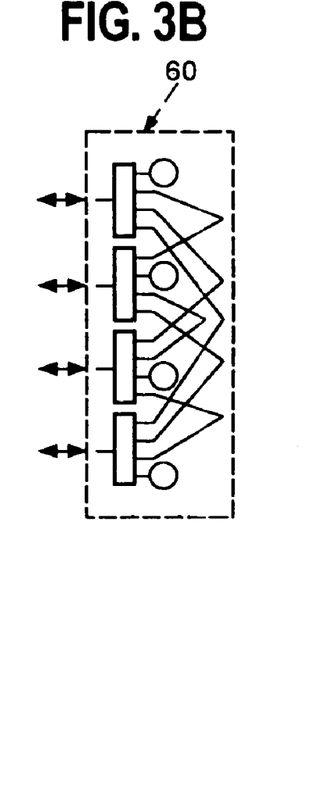

If 1×4 duplex switches (e.g., 1×(N) type duplex switches) are used, a strictly non-blocking switch architecture having loop-back may be implemented. Such an architecture is illustrated in FIG. 3B. Interconnections between the duplex switches in such and architecture are as set forth in Table 2.

TABLE 2

| Switch Position | Internal Port Position | Internal Port Connection |
|---|---|---|
| 1 | 1 | Loop-back |
| 1 | 2 | Internal Port 1 Of Switch at Switch Position 2 |
| 1 | 3 | Internal Port 1 Of Switch at Switch Position 3 |
| 1 | 4 | Internal Port 1 Of Switch at Switch Position 4 |
| 2 | 1 | Internal Port 2 Of Switch at Switch Position 1 |
| 2 | 2 | Loop-back |
| 2 | 3 | Internal Port 2 Of Switch at Switch Position 3 |
| 2 | 4 | Internal Port 2 Of Switch at Switch Position 4 |
| 3 | 1 | Internal Port 3 Of Switch at Switch Position 1 |
| 3 | 2 | Internal Port 3 Of Switch at Switch Position 2 |
| 3 | 3 | Loop-back |
| 3 | 4 | Internal Port 3 Of Switch at Switch Position 4 |
| 4 | 1 | Internal Port 4 Of Switch at Switch Position 1 |
| 4 | 2 | Internal Port 4 Of Switch at Switch Position 2 |
| 4 | 3 | Internal Port 4 Of Switch at Switch Position 3 |
| 4 | 4 | Loop-back |

It will be recognized in view of the foregoing description that other permutations for interconnect fabric are also possible. The principal goal is to connect each switch to every other switch by at least a single fabric interconnection. The specific interconnections of the duplex switches of the 1×N switch type in Table 2, however, can be generalized in the following manner. Let X represent the switch position of the duplex switch in the overall switch architecture, where X is a number from, for example, 1 through N. Let Y represent the fabric port of switch X, where Y is a number from, for example, 1 through N. To interconnect the duplex switches to form a strictly non-blocking, N-way switch for reciprocal traffic, each fabric port Y of each switch X is connected to the fabric port X of switch Y when X≠Y, and wherein each path Y may optionally be used for loop-back when X=Y. Again, such interconnections are made starting with switch X=1 until each duplex switch is connected to every other duplex switch of the interconnection fabric by a single connection.

Figure 4:
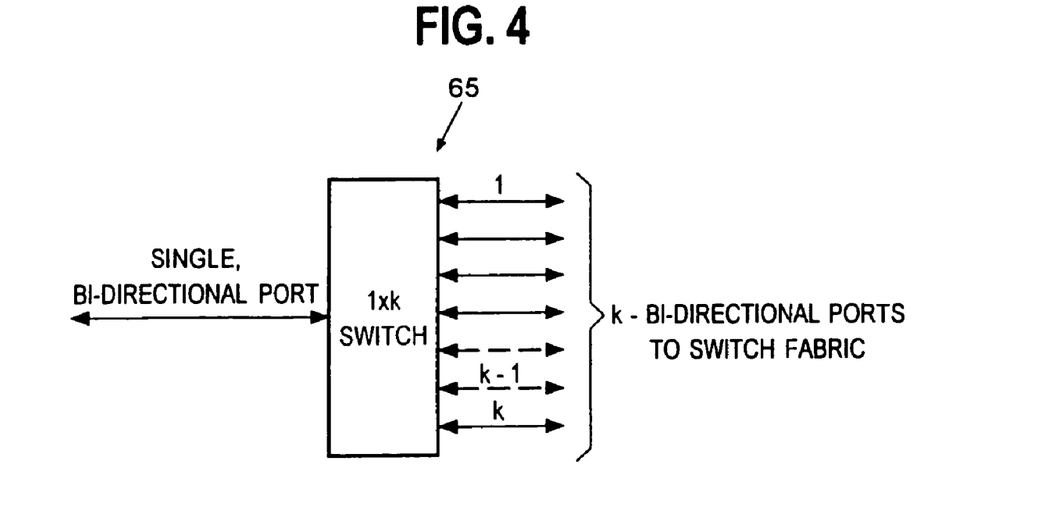
FIG. 4 is a block diagram of a 1×k duplex switch.
Figure 5A:
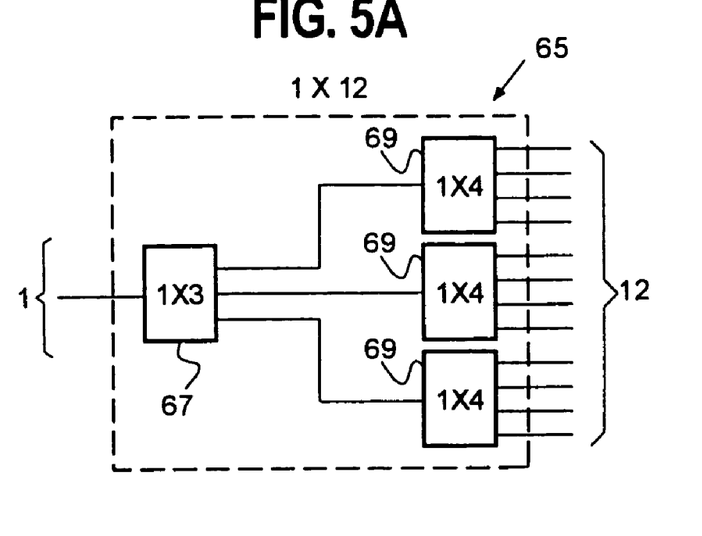
FIGS. 5A and 5B are block diagrams of 1×k duplex switches constructed from smaller order duplex switches.
Figure 5B:
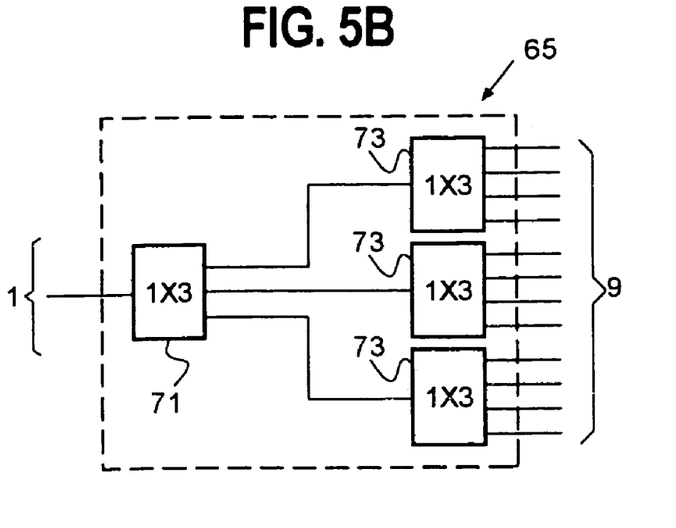

FIGS. 5A and 5B illustrates various manners in which duplex switches of a lesser order may be cascaded to form larger 1×k duplex switches, such as the one shown at 65 of FIG. 4. More particularly, FIG. 5A illustrates a 1×12 reciprocal switch at 65 that is comprised of a single 1×3 reciprocal switch 67 that is cascaded with a further group of three 1×4 reciprocal switches 69. In like fashion, FIG. 5B illustrates a 1×9 reciprocal switch at 65 that is comprised of a single 1×3 switch 71 that is cascaded with a further group of three 1×3 reciprocal switches 73. It will be recognized that other 1×k reciprocal switches may be formed from lesser order reciprocal switches. In such instances, the overall switching architecture may be optimized by using as few of the lower order or reciprocal switch types as possible, thereby reducing the number of component types required to manufacture the overall switch.

Other switch architectures may be implemented in accordance with the foregoing principles. One such architecture is the (n,m)-way module, shown generally at 80 of FIG. 6A. The (n,m)-way module 80 is similar in functionality to the n-way module 60 of FIG. 3, except that it has n+m duplex switches. The duplex switches are logically divided into two groups: a first group of switches 85 numbering n and a second group of switches 90 numbering m. Only the first group of switches 85 can form duplex connections to any other port in the module 80. The second group of switches 90 can only connect to the switches of the first group 85.

Figure 6A:
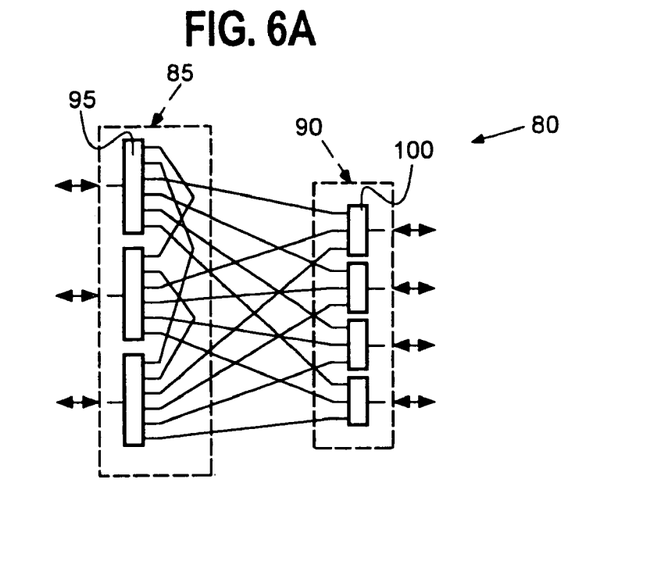
FIGS. 6A and 6B are schematic block diagrams of various embodiments of (n,m) way reciprocal switches constructed in accordance with the present invention.

In the preferred construction of the (n,m)-way module 80, a total of n duplex switches 95 of the 1×(n+m−1) type are employed for the first group of switches 85 and a total of m duplex switches 100 of the 1×n type are employed for the second group of switches 90. To effect the stated operation of the first group of ports 85, the fabric ports of each switch 95 of the first group of switches 85 are connected to the fabric ports of every other switch in the module 80. This insures that the first group of switches 85 is allowed to form duplex connections to any other switch in the module 80. To effect the stated operation of the second group of switches 90, each fabric port of each switch 100 in the second group of switches 90 is connected only to a respective fabric port of the first group of switches 95. As such, each duplex switch of the first group of switches 85 is connected to every other switch by a single interconnection, while each duplex switch of the second group of switches 90 is interconnected to each of the first group of switches 85 by a single interconnection without further interconnection to any of the switches 100 of the second group.

The exemplary module 80 of FIG. 6A illustrates construction of a (3,4)-way module. Interconnections between the duplex switches in the illustrated architecture are as set forth in Table 3. Again, various permutations may be employed.

TABLE 3

| Switch Position | Fabric Port Position | Fabric Port Connection |
|---|---|---|
| First Group - 1 | 1 | Fabric Port 1 Of First Group Switch at Switch Position 2 |
| First Group - 1 | 2 | Fabric Port 1 Of First Group Switch at Switch Position 3 |
| First Group - 1 | 3 | Fabric Port 1 Of Second Group Switch at Switch Position 1 |
| First Group - 1 | 4 | Fabric Port 1 Of Second Group Switch at Switch Position 2 |
| First Group - 1 | 5 | Fabric Port 1 Of Second Group Switch at Switch Position 3 |
| First Group - 1 | 6 | Fabric Port 1 Of Second Group Switch at Switch Position 4 |
| First Group - 2 | 1 | Fabric Port 1 Of First Group Switch at Switch Position 1 |
| First Group - 2 | 2 | Fabric Port 2 Of First Group Switch at Switch Position 3 |
| First Group - 2 | 3 | Fabric Port 2 Of Second Group Switch at Switch Position 1 |
| First Group - 2 | 4 | Fabric Port 2 Of Second Group Switch at Switch Position 2 |
| First Group - 2 | 5 | Fabric Port 2 Of Second Group Switch at Switch Position 3 |

TABLE 3-continued

| Switch Position | Fabric Port Position | Fabric Port Connection |
|---|---|---|
| First Group - 2 | 6 | Fabric Port 2 Of Second Group Switch at Switch Position 4 |
| First Group - 3 | 1 | Fabric Port 2 Of First Group Switch at Switch Position 1 |
| First Group - 3 | 2 | Fabric Port 2 Of First Group Switch at Switch Position 2 |
| First Group - 3 | 3 | Fabric Port 3 Of Second Group Switch at Switch Position 1 |
| First Group - 3 | 4 | Fabric Port 3 Of Second Group Switch at Switch Position 2 |
| First Group - 3 | 5 | Fabric Port 3 Of Second Group Switch at Switch Position 3 |
| First Group - 3 | 6 | Fabric Port 3 Of Second Group Switch at Switch Position 4 |

Figure 6B:
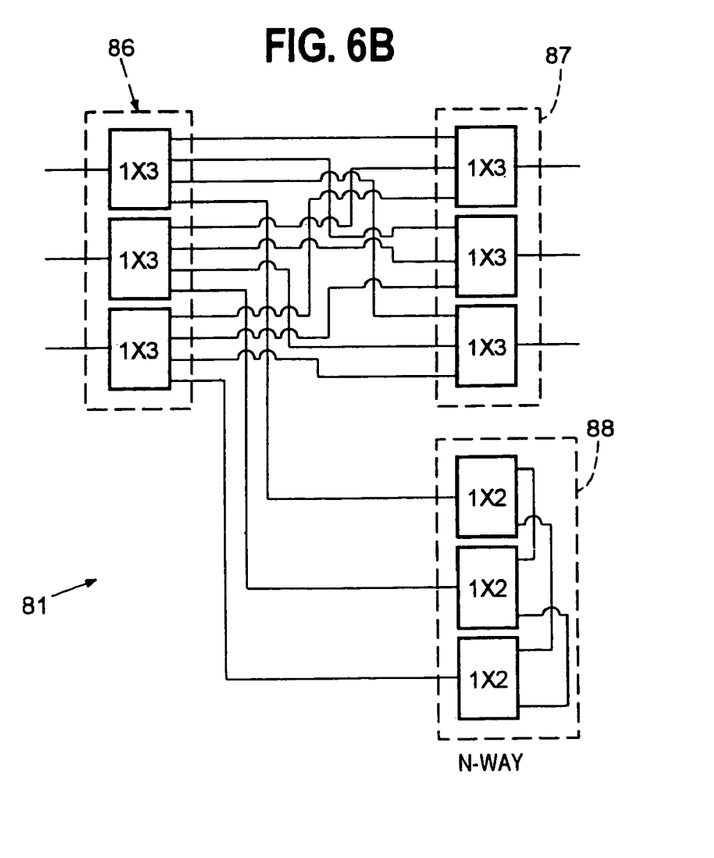

An alternative construction of an (n,m)-way switch is illustrated in FIG. 6B. In the specific exemplary alternative construction shown, the duplex switches are connected to form a (3,3)-way switch. As above, the switch, shown generally at 81, comprises a first group of duplex switches 86 and a second group of duplex switches 87. Only the first group of switches 86 can form duplex connections to any other port in the module 81. The second group of switches 87 can only connect to the switches of the first group 86. To effect duplex connection between the ports of the first group of switches 86, an n-way switch 88 is used to interconnect the fabric ports of the duplex switches of the first group 86. The advantage of the alternative structure is that module 88 is simply an n-way switch. By choosing the cardinality of the individual modules of the final overall switch architecture, the number of different part types used in the switch maybe reduced.

Figure 7:
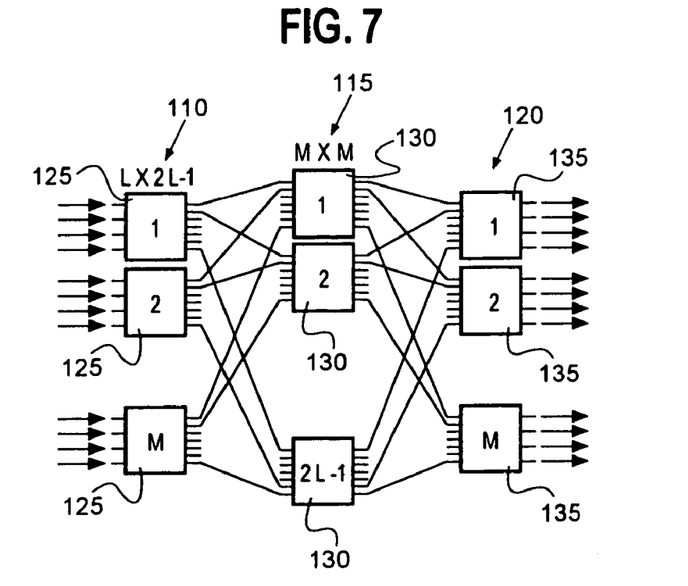
FIG. 7 is a schematic block diagram of an LM×LM non-blocking, Clos switch core.

The architecture of the n-way reciprocal and (n,m)-way reciprocal modules 60, 80 set forth in FIGS. 3 and 6A (6B), respectively, may be combined to emulate a Clos-like switching core. For comparison, a three-stage LM×LM Clos switching core is illustrated in FIG. 7. As illustrated, there are three groups of switches 110, 115, and 120. The first group of switches 110 is comprised of conventional, unidirectional switches 125 numbering M of the L×2L-1 switch type. The second group of switches 115 is comprised of conventional, unidirectional switches 130 numbering 2L-1 of the M×M switch type. The third group of switches 120 is comprised of conventional, unidirectional switches 135 numbering M of the 2L-1×L switch type.

The interaction of the switch groups 110, 115, and 120 and operation of the resultant switching core are well-known. A significant property of the Clos switching structure is its recursive nature. This recursive property allows a larger Clos switch to be formed from a plurality of smaller Clos switch structures.

Figure 8:
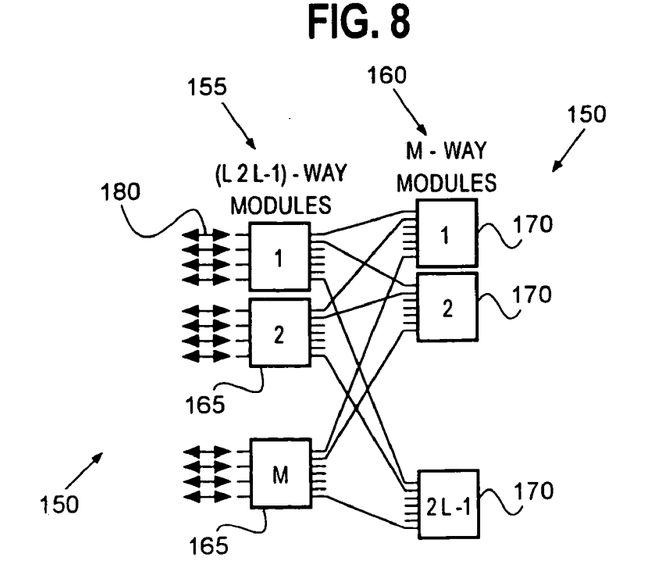
FIG. 8 is a schematic block diagram of an LM port reciprocal switch core constructed in accordance with the teachings of the present invention.

FIG. 8 illustrates a strictly non-blocking core switch 150 having fewer switches, yet having the same functionality as the LM×LM Clos switch of FIG. 7, except that such functionality is limited to reciprocal traffic. The switch core 150 is implemented using a plurality of switching modules of the types described above in connection with FIGS. 3 (or 5) and 6. As illustrated, the switch core 150 employs two groups of switching modules 155 and 160. The first group of modules 155 is comprised of a plurality of (L,2L-1)-way modules 165 numbering M. The (L,2L-1)-way modules 165 are designed in accordance with the principles of the (n,m)-way reciprocal switching module described above in connection with FIG. 6, where n=L and m=2L-1. The second group of modules 160 is comprised of a plurality of M-way reciprocal switching modules 170 numbering 2L-1. The M-way modules 170 are designed in accordance with the principles of the N-way reciprocal switching module described above in connection with FIG. 3A, where N=M.

The modules 165 of the first group of modules 155 are connected to the modules 170 of the second group of modules 160 so that traffic at the externally disposed I/O ports 180 handle reciprocal traffic in a strictly non-blocking manner. To this end, the fabric port at position j of the module 165 at position k of the first group of modules 155 is connected to the fabric port at position k of the module 170 at position j of the second group of modules 160. Examples of this interconnection are set forth in Table 4.

TABLE 4

| Module Position | Fabric Port Position | Fabric Port Connection |
|---|---|---|
| First Group - 1 | 1 | Fabric Port 1 Of Module of Second Group at Position 1 |
| First Group - 1 | 2 | Fabric Port 1 Of Module of Second Group at Position 2 |
| First Group - 1 | 3 | Fabric Port 1 Of Module of Second Group at Position 3 |
| . | . | . |
| . | . | . |
| . | . | . |
| First Group - 1 | L | Fabric Port 1 Of Module of Second Group at Position L |
| First Group - 2 | 1 | Fabric Port 2 Of Second Group Switch at Switch Position 1 |
| . | . | . |
| . | . | . |
| First Group - 2 | L | Fabric Port 2 Of Second Group Switch at Switch Position L |
| . | . | . |
| . | . | . |
| First Group - M | L | Fabric Port M Of Second Group Switch at Switch Position L |

Again, there are areas permutations that will work as long as each module of the first group is connected to every module in the second group. The LM-way reciprocal core 150 appears to emulate a folded version of the Clos architecture of FIG. 7. The second group of modules 160 of the LM-way reciprocal core is simply the left half of the middle Clos stage 115 while the first group of modules 155 of the reciprocal core 150 takes on the role of both outer stages 110 and 120 of the Clos architecture.

Table 5 summarizes the complexity of the Clos switch core of FIG. 7 and the switch core 150 in terms of the number of each elemental switch type employed to implement the core, assuming each module in FIGS. 7 and 8 is implemented using 1×X switches and that the (n,M)-way modules are implemented as shown in FIG. 6A:

TABLE 5A

| LM-WAY RECIPROCAL CORE | | LM × LM NON-BLOCKING CLOS Simplex | |
|---|---|---|---|
| Duplex Switch Type | No. Of Switches | Switch Type | No. Of Switches |
| 1 × 3L−1 | LM | 1 × 3L−1 | None |
| 1 × 2L−1 | None | 1 × 2L−1 | 2ML |
| 1 × L | M(2L−1) | 1 × L | 2M(2L−1) |
| 1 × M−1 | M(2L−1) | 1 × M | 2M(2L−1) |

The LM-way reciprocal core 150 employs half as many elemental switches as the traditional Clos core. In the LM-way reciprocal core 150, however, the 1×2L−1 switch type is replaced with a 1×3L−1 switch type for implementing the (L,2L−1)-way modules 165. Although the elemental switches of the LM-way reciprocal core 150 are duplex switches which are generally more costly than traditional switches, the incremental costs for such duplex switches will not generally exceed the savings resulting from the reduced number of elemental duplex switches that are utilized. Further savings are realized from the present invention in terms of power and space requirements as well.

Similar efficiencies are realized when it is assumed that the (n,m)-way modules of switch 150 are implemented as shown in FIG. 6B. Such a comparison to the Clos switch is set forth in Table 5B.

TABLE 5B

| LM-WAY RECIPROCAL CORE | | LM × LM NON-BLOCKING CLOS Simplex | |
|---|---|---|---|
| Duplex Switch Type | No. Of Switches | Switch Type | No. Of Switches |
| 1 × 3L−1 | None | 1 × 3L−1 | None |
| 1 × 2L−1 | LM | 1 × 2L−1 | 2ML |
| 1 × L | M(2L−1) + LM | 1 × L | 2M(2L−1) |
| 1 × M−1 | M(2L−1) | 1 × M | 2M(2L−1) |

As illustrated, the LM-way switch 150, when using the architecture of FIG. 6B, uses half as many 1×2L−1 and 1×M the switches, and approximately ¾ the number of 1×L switches, Although the elemental switches used by the reciprocal core are duplex switches, and those of the Clos architecture are simplex switches, a cost savings can still be realized if the cost of a duplex switch is less than twice the cost of the simplex switch counterpart.

The traditional Clos architecture is a recursive architecture; i.e., a larger Clos core can be built using one or more smaller Clos cores in the middle stages. Similarly, the LM-way reciprocal core architecture is also recursive. The LM-way reciprocal core 150 has the functionality of a LM-way duplex module. As such, it can be utilized as the second stage module of a larger core. For example, a 256-port reciprocal core can be made by using three LM-way reciprocal cores of 128 ports each as the second group of modules 160 in the architecture of FIG. 8, and 128 (2,3)-way modules as the first group of modules 155. Such recursiveness facilitates ready expansion of an existing switch thereby allowing a user to upgrade their switching system without disposing of existing hardware. Indeed, the LM-way reciprocal core 150 may be modular—upgrading of the core merely comprising the addition of one or more further modules.

The first group of switches 155 of FIG. 8 can also be used to expand an existing LM× LM non-reciprocal, non-blocking core, such as the one illustrated in FIG. 7. In such instances, the second group of switches 160 of FIG. 8 are replaced by a plurality of LM×LM non-blocking cores, such as those illustrated in FIG. 7. This allows the (n,m)-way architectures to expand existing non-reciprocal core architectures thereby eliminating the need to purchase new switching cores to replace the older, existing switching cores.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. A method for managing a switch core, comprising:
arranging N duplex switches of at least a 1×(N−1) switch type, including directly connecting each of the duplex switches to every other of the duplex switches.

2. The method of claim 1, wherein connecting comprises setting up signal paths between ports of the duplex switches.

3. The method of claim 2, wherein connecting further comprises setting up the signal paths to be reciprocal.

4. The method of claim 3, wherein setting up the signal paths to be reciprocal comprises arranging a same set of optics within each of the duplex switches to transmit signals reciprocally.

5. The method of claim 2, wherein setting up the signal paths comprises arranging optics to transmit signals between the ports.

6. The method of claim 1, wherein each of the duplex switches is a switch that is adapted to allow signal traffic to flow into and out of the switch.

7. The method of claim 1, wherein each of the duplex switches is a switch that is adapted to function as an input and output switch.

8. A method for managing a switch core, comprising:
arranging N duplex switches of at least a 1×N switch type, including directly connecting each of the duplex switches to every other of the duplex switches.

9. The method of claim 8, further comprising looping-back each of the duplex switches.

10. The method of claim 9, wherein looping-back comprises setting up a signal path from a port and to the port in each of the duplex switches.

11. The method of claim 8, wherein connecting comprises setting up signal paths between ports of the duplex switches.

12. The method of claim 11, wherein connecting further comprises setting up the signal paths to be reciprocal.

13. The method of claim 12, wherein setting up the signal paths to be reciprocal comprises arranging a same set of optics within each of the duplex switches to transmit signals reciprocally.

14. The method of claim 11, wherein setting up the signal paths comprises ranging optics to transmit signals between the parts.

15. The method of claim 8, wherein each of the duplex switches is a switch that is adapted to allow signal traffic to flow into and out of the switch.

16. The method of claim 8, wherein each of the duplex switches is a switch that is adapted to function as an input and output switch.

17. A switch core, comprising:

N duplex switches of at least a 1×N switch type, wherein each of the duplex switches is adapted to be directly connected to every other of the duplex switches.

18. The switch core of claim 17, wherein the duplex switches are adapted to be looped-back.

19. The switch core of claim 17, wherein the duplex switches are adapted to be connected to every other of the duplex switches by being adapted to connect signal paths between ports of the duplex switches.

20. The switch core of claim 19, wherein the signal paths are reciprocal.

21. The switch core of claim 17, wherein the duplex switches are adapted to be looped-back by being adapted to connect a signal path from a port and to the port of each of the duplex switches.

22. The switch core of claim 17, wherein each of the duplex switches is a switch that is adapted to allow signal traffic to flow into and out of the switch.

23. The switch core of claim 17, wherein each of the duplex switches is a switch that is adapted to function as an input and output switch.

24. A switch core, comprising:

N duplex switches of at least a 1×N switch type, wherein the duplex switches are adapted to be directly connected to every other of the duplex switches by being adopted to connect signal paths between ports of the duplex switches and optics within each of the duplex switches are adapted to transmit signals between the ports.

25. The switch core of claim 24, wherein the optics are at least one of actuators, mirrors and lenses.

26. A switch core, comprising:

N duplex switches of at least a 1×N switch type, wherein the duplex switches are adapted to be directly connected to every other of the duplex switches, the duplex switches are adapted to be looped back by being adapted to connect a signal path from a port and to the port of each of the duplex switches and a single set of optics within each of the duplex switches is adapted to reciprocally transmit signals to and from each of the duplex switches.

* * * * *